(No Model.) 2 Sheets—Sheet 1.
W. VOLLMER & W. H. THOMAS.
MACHINE FOR SWAGING OR EXPANDING TUBES.
No. 489,439. Patented Jan. 3, 1893.
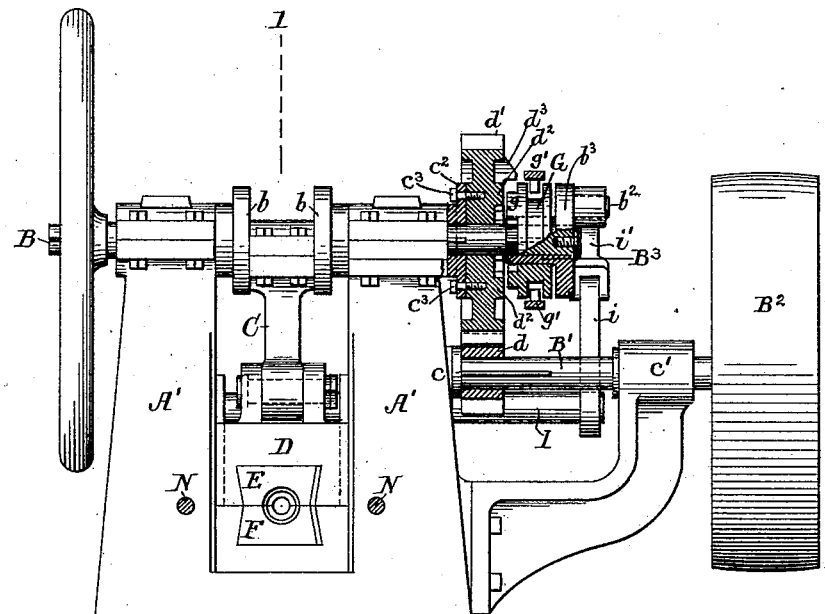
FIG. 1.
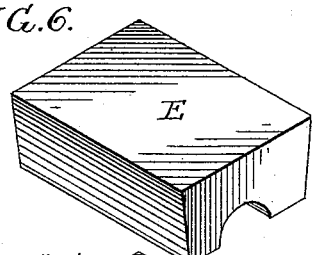
FIG. 6.
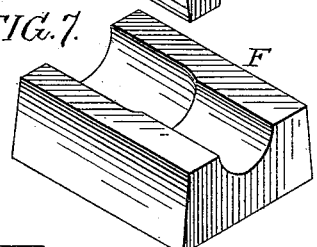
FIG. 7.
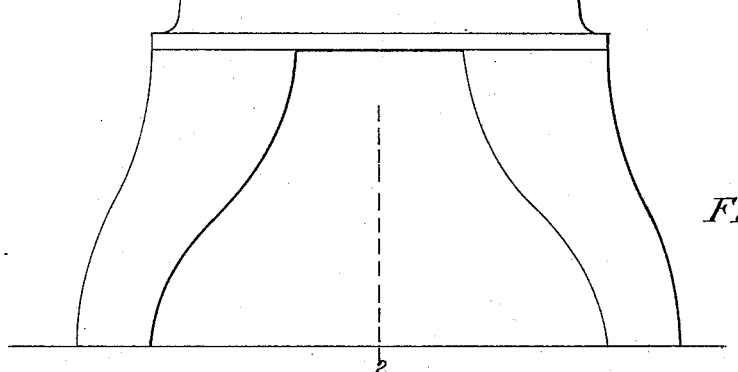
FIG. 8. FIG. 9.
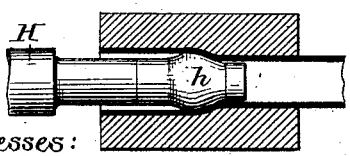
Witnesses:
Alex. Barkoff
R. Schleicher
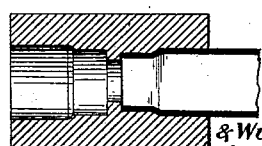
Inventors:
William Vollmer
& William H. Thomas
by their Attorneys
Howson & Howson

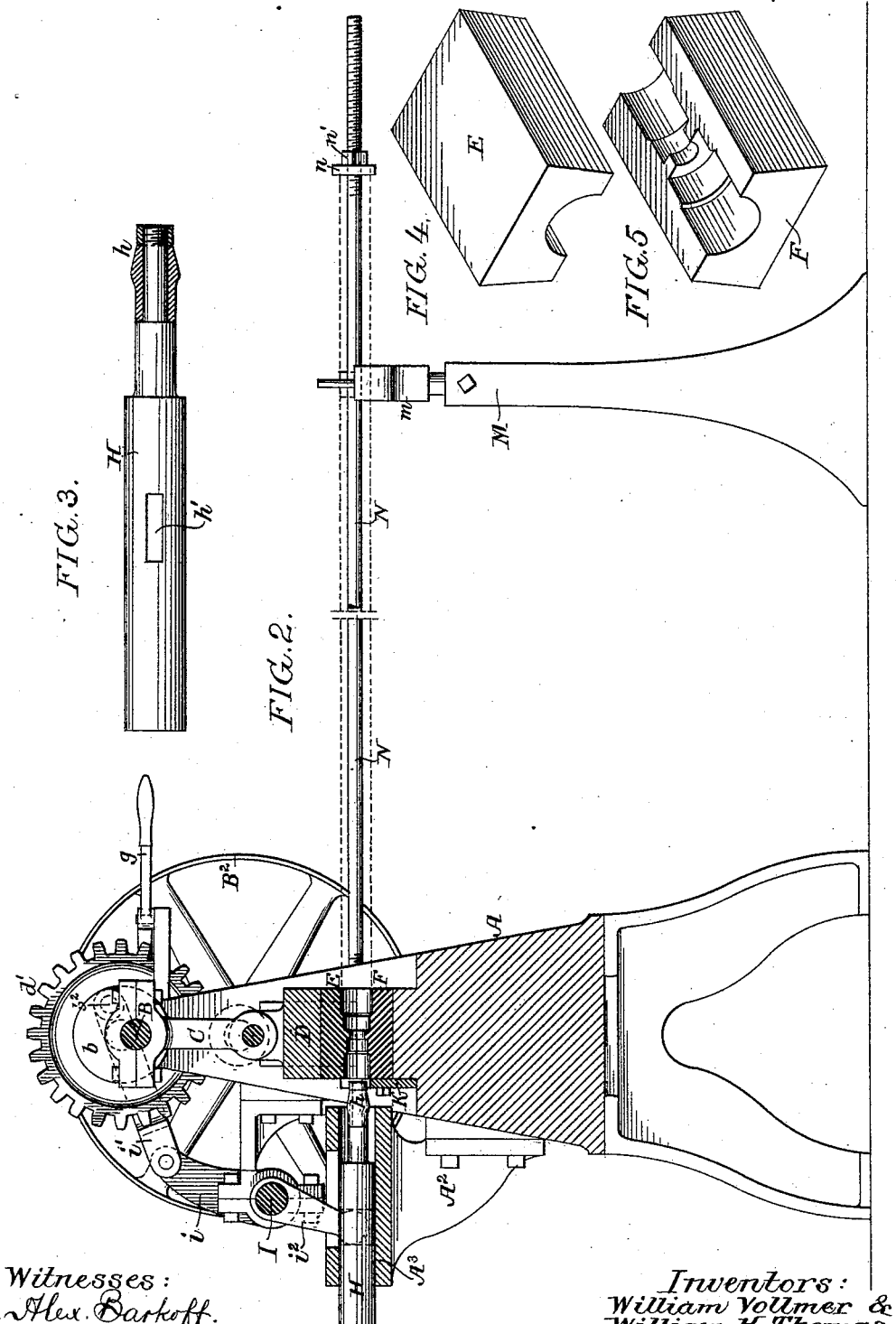

UNITED STATES PATENT OFFICE.

WILLIAM VOLLMER AND WILLIAM H. THOMAS, OF PHILADELPHIA, PENNSYLVANIA, ASSIGNORS TO BURNHAM WILLIAMS & CO., OF SAME PLACE.

MACHINE FOR SWAGING OR EXPANDING TUBES.

SPECIFICATION forming part of Letters Patent No. 489,439, dated January 3, 1893.

Application filed August 31, 1892. Serial No. 444,681. (No model.)

*To all whom it may concern:*

Be it known that we, WILLIAM VOLLMER and WILLIAM H. THOMAS, both citizens of the United States, and residents of Philadelphia, Pennsylvania, have invented certain Improvements in Machines for Swaging or Expanding Tubes, of which the following is a specification.

The object of our invention is to construct an improved machine for swaging or expanding metal tubes.

In the accompanying drawings:—Figure 1, is a face view of our improved combined swaging and expanding machine; Fig. 2, is a section on the line 1—2, Fig. 1; Fig. 3, is a detached view of the mandrel; Figs. 4 and 5, are detached perspective views of the swaging dies; Figs. 6 and 7, are detached perspective views of the expanding dies.

A is the frame of the machine mounted on suitable legs and having two uprights A' supporting the crank shaft B which has a crank $b$ connected to the head D by a connecting rod C, this head slides vertically upon guides on the uprights A'. The head D carries the upper die E while the lower die F is carried by the main frame A; these dies are attached to the frame in any suitable manner, they are shown in the drawings as dove-tailed and keyed in place.

B' is the driving shaft provided with a suitable belt wheel $B^2$ and adapted to bearings $c$ $c'$ on the frame of the machine; the shaft B' is geared to the shaft B through the pinion $d$ and gear wheel $d'$, the gear wheel is secured to the shaft by a disk $c^2$ and screw $c^3$.

Mounted on the shaft B is a sleeve $B^3$ carrying a disk $b^3$ in which is a crank pin $b^2$, the sleeve is loose upon the shaft but can be thrown into gear therewith by a clutch sleeve G splined on the sleeve $B^3$ and having teeth $g$ which engage with teeth $d^2$ on the gear wheel $d'$. A clutch lever $g$ is provided to throw the clutch into gear, a lug $d^3$ on the wheel $d'$ acts upon the lever to throw the clutch out of gear at each revolution.

Supported on the bracket $A^2$ at the rear of the frame A is a cylindrical bearing $A^3$ for the plunger H, this plunger carries at its outer end the mandrel $h$ which is inserted into the tube to be expanded. The plunger is operated from a rock shaft I having an arm $i$ which is connected, by a link $i'$, to a crank pin $b^2$ on the disk $b^3$. The rock shaft I, has an arm $i^2$ which extends into a slot $h'$ in the mandrel H so that as the shaft I rocks the mandrel will move into and out of the dies.

The mandrel is only used in expanding the tubes its mechanism being thrown into gear by the clutch G and so timed that when the dies grasp the tube it is forced into the tube and expands it as shown in Fig. 8, the mechanism being thrown out of gear when the swaging dies are used as shown in Fig. 9.

The swaging dies we prefer to make double as shown, so that different sized tubes can be swaged with the same dies, both ends of the dies may be made alike so that when one side wears away the other side may be used. Directly back of the dies is secured a plate K which acts as a check to prevent the pipes passing beyond the dies when the expanding dies are used. The tubes as shown by dotted lines in Fig. 2, are supported by a stand having a vertically adjustable portion $m$, the tubes are held in position against the thrust of the expanding mandrel by a cross bar $n$ tied to the frame A by tie rods N N, the tie rods are screw threaded at their outer ends and provided with nuts $n'$ resting back of the cross bar $n$.

Our invention is especially applicable to swaging and expanding the tubes used in the construction of boilers especially locomotive boilers, but it will be understood that the invention may be used to swage and expand other tubes without departing from our invention.

We claim as our invention:—

1. The combination in a combined tube swaging and expanding machine, of the dies, a crank shaft connected to one of said dies, an expanding mandrel adapted to move into said dies, a rock shaft for reciprocating said mandrel, with a clutch for throwing said rock shaft into and out of gear with the crank shaft, substantially as specified.

2. The combination of the frame A having uprights A', the crank shaft B mounted on said uprights, a head D, connected to the crank of said crank shaft, the lower die carried by the frame and the upper die carried by the head, with the reciprocated plunger at the back of the frame and in line with the dies, and rock shaft giving reciprocating motion to said plunger and connected to the driving mechanism, substantially as described.

3. The combination in a combined swaging and expanding machine of the frame A, the crank shaft supported thereby, a head mounted upon ways in said frame and connected to the crank of the crank shaft, die carried by the head and die carried by the frame and reciprocated plunger in line with the dies and back of the frame, and having a mandrel adapted to pass between the dies, a rock shaft for reciprocating said plunger, an arm on said rock shaft a sleeve carried by the crank shaft, a crank pin on said sleeve connected to the rock shaft arm, a driving shaft, gearing connecting the driving shaft to the crank shaft, a clutch intervening between the crank shaft and the sleeve, substantially as described.

In testimony whereof we have signed our names to this specification in the presence of two subscribing witnesses.

WM. VOLLMER.
WM. H. THOMAS.

Witnesses:
GEO. SCHABINGER,
THEO. F. SCOTT.